US008064478B2

(12) United States Patent
Morrow et al.

(10) Patent No.: US 8,064,478 B2
(45) Date of Patent: Nov. 22, 2011

(54) HYBRID NETWORK SYSTEM AND METHOD

(75) Inventors: James W. Morrow, Sparks, NV (US); Walter E. Eisele, Reno, NV (US); Warren R. White, Reno, NV (US)

(73) Assignee: Bally Gaming International, Inc., Las Vegas, NV (US)

( * ) Notice: Subject to any disclaimer, the term of this patent is extended or adjusted under 35 U.S.C. 154(b) by 1813 days.

(21) Appl. No.: 11/225,764

(22) Filed: Sep. 12, 2005

(65) Prior Publication Data

US 2007/0060366 A1 Mar. 15, 2007

(51) Int. Cl.
*H04J 3/22* (2006.01)

(52) U.S. Cl. ........ 370/466; 370/467; 370/908; 370/911; 370/914; 463/42

(58) Field of Classification Search ........................ None
See application file for complete search history.

(56) References Cited

U.S. PATENT DOCUMENTS

| | | | | |
|---|---|---|---|---|
| 6,227,974 | B1 | 5/2001 | Eilat et al. | |
| 6,725,106 | B1 * | 4/2004 | Covington et al. | 700/82 |
| 6,875,110 | B1 * | 4/2005 | Crumby | 463/42 |
| 6,884,174 | B2 * | 4/2005 | Lundy et al. | 463/42 |
| 2002/0155887 | A1 * | 10/2002 | Criss-Puszkiewicz et al. | 463/29 |
| 2002/0159393 | A1 | 10/2002 | Smith et al. | |
| 2004/0120283 | A1 | 6/2004 | Rezaiifar et al. | |
| 2004/0132532 | A1 * | 7/2004 | Brosnan et al. | 463/42 |
| 2005/0129022 | A1 | 6/2005 | Mugica et al. | |
| 2006/0217202 | A1 * | 9/2006 | Burke et al. | 463/42 |
| 2007/0043875 | A1 * | 2/2007 | Brannon, Jr. | 709/231 |

* cited by examiner

*Primary Examiner* — Anthony Sol
(74) *Attorney, Agent, or Firm* — Steptoe & Johnson LLP

(57) ABSTRACT

A hybrid network system and method is used for incrementally upgrading a gaming system from legacy equipment to broadband equipment while maintaining the capability to support the assets and functionality of both legacy gaming devices and networks and modern gaming devices and networks. The hybrid network system enables new gaming devices and networks to coexist in the same system as existing, legacy gaming devices and networks, and thereby upgrade components as resources and availability allow. The hybrid network system enables the addition of modern devices and networks having new capabilities while continuing to support legacy equipment that is currently in use.

19 Claims, 7 Drawing Sheets

HYBRID NETWORK SYSTEM AND METHOD

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a system and method for enabling a hybrid network that facilitates incrementally upgrading slot data networks, systems, and gaming devices, and more particularly, to a system and method for enabling a hybrid network that facilitates the incremental upgrading of an existing slot system and network to one employing faster communication or broader bandwidth communications channels.

BACKGROUND OF THE INVENTION

Traditionally, gaming networks have been custom designed for gaming purposes only. In this regard, gaming networks have been constructed only to include gaming functionality and have lagged behind the rapid growth of network and communications capability available in the computing, communications and Internet industries. FIG. 1 illustrates a network gaming system known in the art. Gaming devices 100 are interconnected with cable 120 (e.g., data line) to form a floor-side, serial (narrow band) network 120. This cable can take the form of multi-wire cable, for example, Belden 8723 cable. Category 5 cable is preferred in many systems due to its guaranteed propagation characteristics and standardization in the cabling industry.

FIG. 1 shows three sets of gaming devices for illustration purposes. Each of lines 120 can support up to 250 gaming devices. A game networking bridge 110 provides a connection from the traditional gaming devices 100, which are interconnected on a serial (narrow band) network 120, to a server-side, slot data server 140, which is interconnected over a backend, broadband network 130. The slot data server 140 has a live backup data server 140. Between the slot data servers 140 is a common database 160. Another broadband connection 150 links the slot data servers 140 and database 160 with player and property management servers 180 and their respective databases 170.

Typically, play on the gaming device 100 generates data related to "coin in," "coin out," "drop," "door opens," jackpots, and other relevant information. Other examples of data generated during game play include "player-card-in" data, and messages from the backend servers 140 and 180 that are directed to a particular player on the slot machine 100, wherein each slot machine has a player tracking device and display for the player to access information and a keypad for the player to input information.

In many older, or "legacy," slot systems, the data line 120 is constructed for robust and reliable communications in the harsh environment of the casino, wherein in many cases, slot systems remain up 24 hours a day, 365 days year. Certain legacy slot systems, such as SDS® by Bally Gaming, Inc. of Las Vegas, Nev., were developed in the early 1970's before internet protocol (IP) or packet-based networks, such as the Internet and Ethernet networks, were developed to the current level. The legacy systems were originally designed to provide security and accounting information from the gaming device 100 to the backend server 140 over the cable 120, which was a serial (narrow band) network. Security information included door opens, machine breakdowns, and tilt conditions. Accounting information was related to profit and loss of the operation and used to detect cheating, skimming, and misreporting for tax purposes. The data transmission needs were modest and sporadic in nature. A data rate of 7,200 bits-per-second (bps) was a more than adequate selection for transmission speed since that data rate provided reliable and robust communication, and was by its unusual data rate, a security measure through obscurity.

Player tracking was added to these systems in the late 1980s to provide marketing incentive for the players and casino operators. A player is identified with a magnetic card and the casino operator could thus account for profit and loss due to individual players. Operators could then reward frequent players and entice other players to join their slot club. This provided an incentive for players to patronize one casino operation over another.

An important function of a game networking bridge 110 in prior art systems was to poll the gaming devices 110 on the cable 120. FIG. 2 illustrates a prior art gaming device bridge 110. The bridge 110 contains physical connectors that include, for example, RJ45 connectors, 0.1 inch molex, 0.156 inch molex, or screw terminals. A kernel 308 includes an executing process for polling and receiving messages from the slot floor. This kernel 308 recognizes messages, checks them for errors and proper format, and converts them into a form suitable for subsequent processing. In this type of prior art system, the kernel 308 polls and checks for attached gaming devices and polls those found. It also notices when formerly active devices do not appear anymore and the process reports such a change in status to the slot data server 140.

A multiplexer process 330 accepts inputs and outputs from both the gaming devices 100 on the slot floor and the server 140 (FIG. 1). The messages are tagged with appropriate addressing information and forwarded on to the appropriate party. Socket server processes 380 handle broadband connection and communication through a broadband port 340 to the gaming backend server 140. Typically such communication uses 100 Mbps Ethernet. As such, the socket server processes 380 are required to use TCP/IP protocol, control, and configuration. Thus, the prior art bridge device 110 performs a minimum of intelligent processing on the incoming and outgoing messages. It translates a specific hardware protocol, RS422 used by the kernel 310, into TCP/IP for the port 340. In this regard, address information is modified, as are physical transport and data rate aspects.

Recently, however, casino owners have become aware that the addition of features to gaming machines and the increasing need for operational efficiency, are driving the current proprietary gaming networks toward much greater capabilities such as full-duplex (two-way) connectivity and higher speed (e.g., 100 Mbps or greater) plus improved analytic features. These improvements are expected to bring the player greater game choices, more rapid renewal of the slot floor entertainment options, and greater operational efficiency for the operator. These translate into increased revenue generation and improved profits.

An issue with moving to a new, higher speed gaming network is the business nature of the gaming operation. Typically gaming operations run 24 hours a day, seven days a week, and 365 days a year. Every minute they are operating they are making money. Thus any downtime for maintenance, repair, or upgrade is quite costly in terms of lost time and revenue.

Additionally, it is costly to install the wires, due to slot floors typically employing "Walker Duct" in which the communications cables are buried inside the concrete floor. New wiring requires pulling new cables, or in some instances, the cutting of the concrete. Modern networking infrastructure is expensive as well. The routers, hub, switches, and such, consume a great deal of capital expense. Capital expenditure budgets may not allow a complete re-wiring of a slot floor in one year.

Further, newer commercial communication technology is unproven in the gaming-specific data transmission application. There is concern about viability, reliability, and operation under stress. Moreover, casinos have thousands of slot machines they would like to continue to use as new networking technology is rolled out, since the casino already has a great deal of slot floor interfacing equipment.

Additionally, there are many different ways to communicate to slot machines today and to slot systems. New protocols are being developed. However, for the reasons stated above, it is presently difficult to take advantage of the new protocols.

Thus, it would be desirable to be able to migrate, or swap out, gaming devices on the gaming floor to use new communication formats and technology without the need to do so all at once, disrupting operations and game play in a casino. Accordingly, in light of the discussion above, those skilled in the art would recognize the need for a system that is capable migrating, or swapping out, gaming devices on the gaming floor to use new communication formats and technology without the requirement to do so all at once. The preferred embodiments of the system and method described herein clearly addresses this and other needs.

SUMMARY OF THE INVENTION

Briefly, and in general terms, the claimed invention resolves the above and other problems by providing a system and method for incrementally upgrading a gaming network from a first protocol and first network typology to a second protocol and second network typology over a gradual time period. The system and method also adapts and communicates with both legacy (or older), narrowband, half-duplex gaming devices and broadband, full-duplex enabled gaming devices.

In a preferred embodiment, the system maintains at least some of the existing and operating network, wiring, and other equipment, while gradually rolling out new network, wiring and other equipment. Therefore, in the event of failures or deployment issues, the legacy network remains an effective backup system.

In another aspect, the system interfaces with legacy slot machines. Most of the older (legacy), or existing slot floor communications equipment is still useable in conjunction with an upgraded, higher speed network. The system converts older protocol to a newer protocol, and new protocol to older protocol. A major advantage of such a conversion is that older backend systems can continue to run in conjunction with newer gaming or network equipment that is added to the slot floor. The system has an added benefit of not requiring re-training of the casino floor personnel in new methods of system operation.

In one preferred embodiment, the system includes a gaming network bridge that normalizes messages received in multiple protocols from the floor-side of the hybrid network for use by the server-side of the gaming network. The gaming network bridge includes at least a first floor-side port to connect to a first gaming machine that communicates with the bridge using a first protocol over a serial, narrowband network. For example, and not by way of limitation, the first protocol comprises a relatively low-speed serial polling protocol. The bridge includes at least a second floor-side port to connect to a second gaming machine that communicates with the bridge using a second protocol over a broadband, packet-based network. For example, and not by way of limitation, the second protocol comprises a broadband IP-based protocol.

A message converter translates the serial protocol into a normalized packet protocol for use in the gaming network, and if necessary, converts the second message protocol into a normalized packet protocol for the use in the network. The normalized packet protocol includes packets created by the converter from serial frames received from the first port.

In another preferred embodiment, a method normalizes a gaming network. A first gaming device is connected to a bridge through a first floor-side port on the bridge using a first protocol. In one embodiment, the first protocol comprises a serial protocol implement across a floor-side, serial network. A second gaming device is connected to the bridge through a second floor-side port on the bridge using a second protocol. In one embodiment, the second protocol comprises a packet-based protocol implement across a floor-side, packet-based network. The method includes converting the serial protocol to a normalized packet protocol for use by the server-side gaming network. If necessary, the second message protocol is converted into a normalized packet protocol for use by the server-side gaming network. In one embodiment, the normalized packet protocol includes packets created by the converter from serial frames received from the first port.

In another preferred embodiment, the system enables a hybrid network that includes a floor-side, serial, narrowband network; a floor-side, packet-based, broadband network; and a server-side, packet-based, broadband network that are all connected by a message converter. In this manner, the hybrid network facilitates incrementally upgrading a gaming network from a (1) first protocol implemented across a floor-side, serial, narrowband network to a (2) second protocol implemented across a floor-side, packet-based, broadband network. A bridge includes a first floor-side port for coupling to a first gaming device using a first protocol and first network typology (e.g., a floor-side, serial, narrowband network). The first protocol, for example, and not by way of limitation, comprises a serial protocol. At least a second floor-side port on the bridge couples the bridge to a second gaming device using a second protocol and second network typology (e.g., a floor-side, packet-based, broadband network). A message converter translates the serial protocol to a normalized packet protocol for use by the server-side gaming network. If necessary, the converter translates the second message protocol into a normalized packet protocol for use by the server-side gaming network. In one embodiment, the normalized packet protocol includes packets created by the converter from serial frames received from the first port.

Other features and advantages of the claimed invention will become apparent from the following detailed description when taken in conjunction with the accompanying drawings, which illustrate by way of example, the features of the claimed invention.

DETAILED DESCRIPTION OF THE PREFERRED EMBODIMENTS

Figure 1:
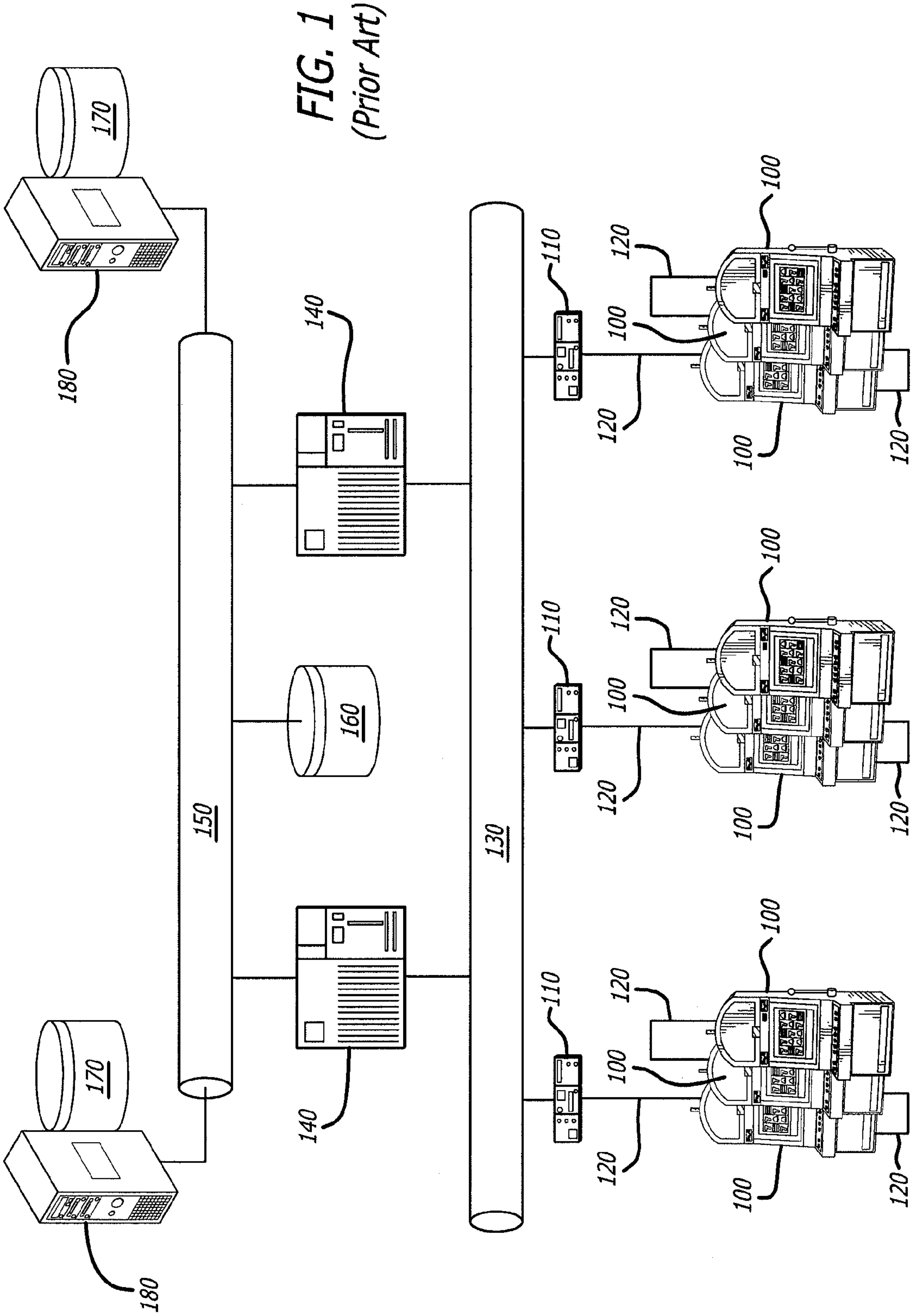
FIG. 1 (Prior Art)
FIG. 1 illustrates a prior art gaming system that connects gaming devices on a casino floor through networking equipment to multiple tiers of servers in the casino backend.
Figure 2:
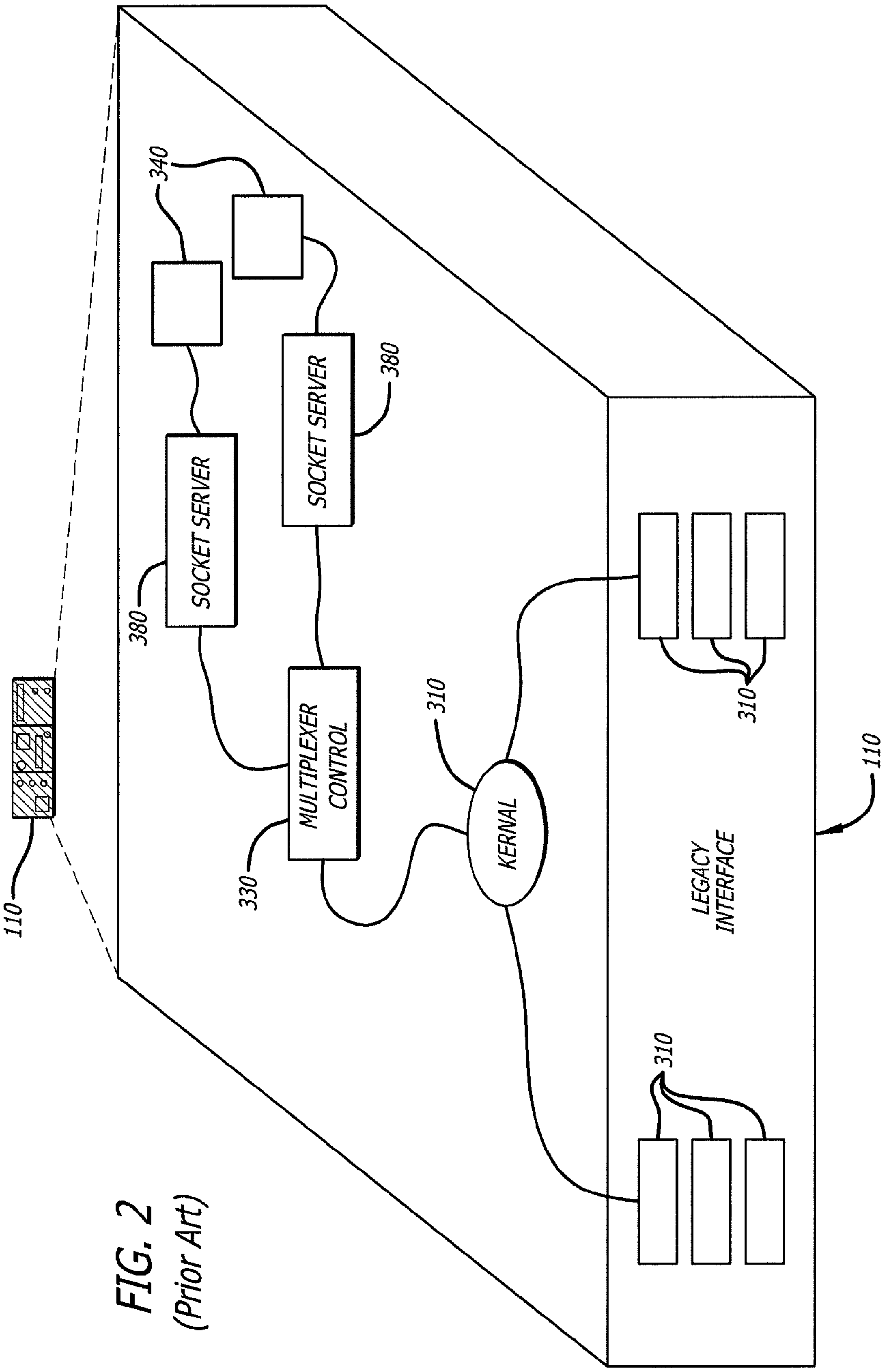
FIG. 2 (Prior Art)
FIG. 2 illustrates a prior art communication bridge.

A preferred embodiment of a hybrid network system, constructed in accordance with the claimed invention, is directed towards incrementally upgrading gaming networks to accommodate new networking technologies, protocols, messaging, and gaming devices in such a way as to keep the currently operating and incompatible networks, protocols, messaging, and gaming devices in operation. In one embodiment, the hybrid network system is implemented using a centrally located apparatus, for example, a game networking bridge. In another embodiment, the hybrid network system is implemented in a distributed format, for example in a game monitoring unit or in an exchange device. In still another embodiment, the hybrid network system is implemented in a combination of a distributed and a centralized form. Referring now again to the drawings, wherein like reference numerals denote like or corresponding parts throughout the drawings, and more particularly to FIGS. 3-9, there is shown a preferred embodiment of hybrid network system 10.

Figure 3:
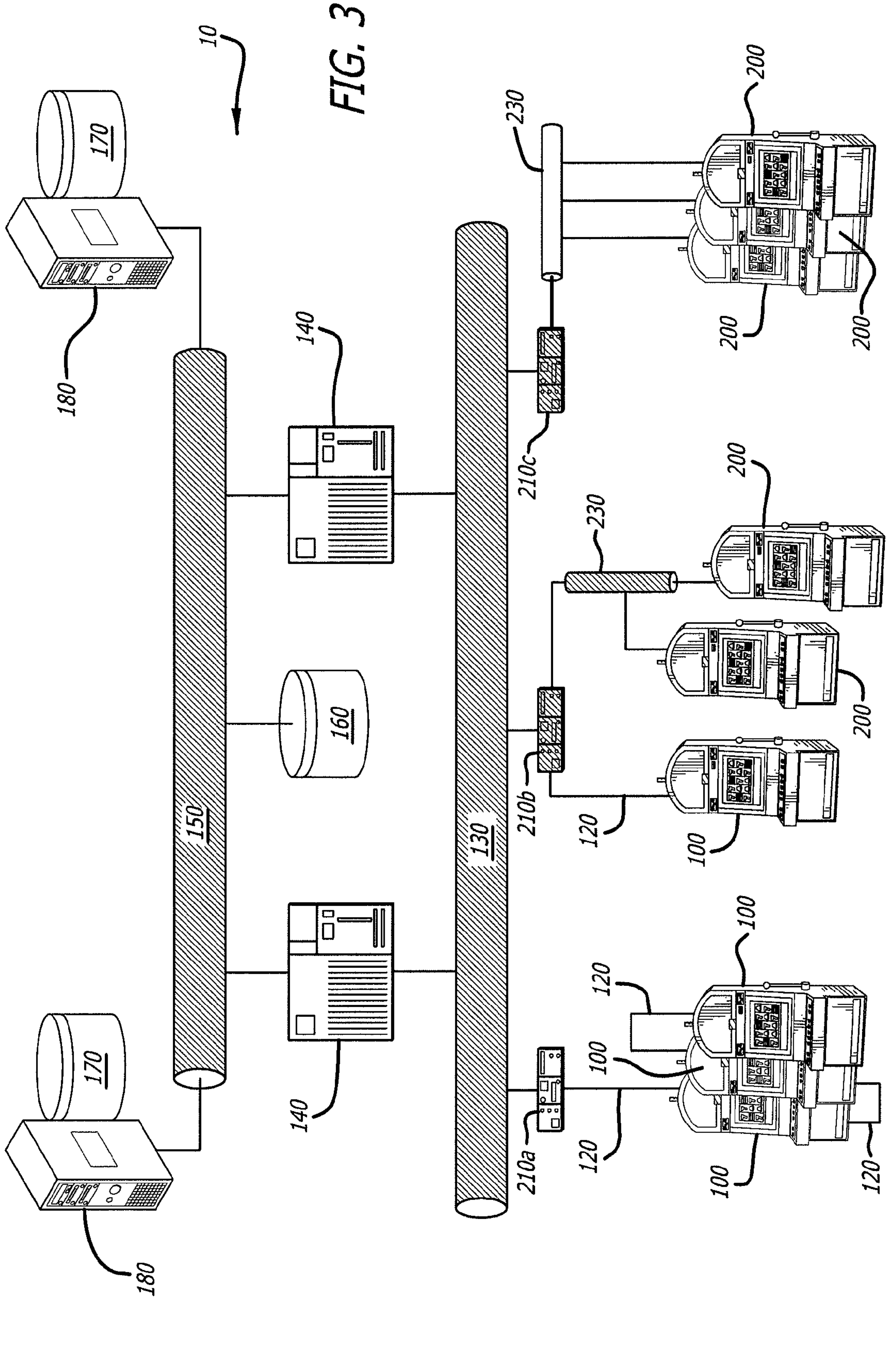
FIG. 3 illustrates components of a hybrid gaming system network according to one embodiment of the invention.
Figure 4:
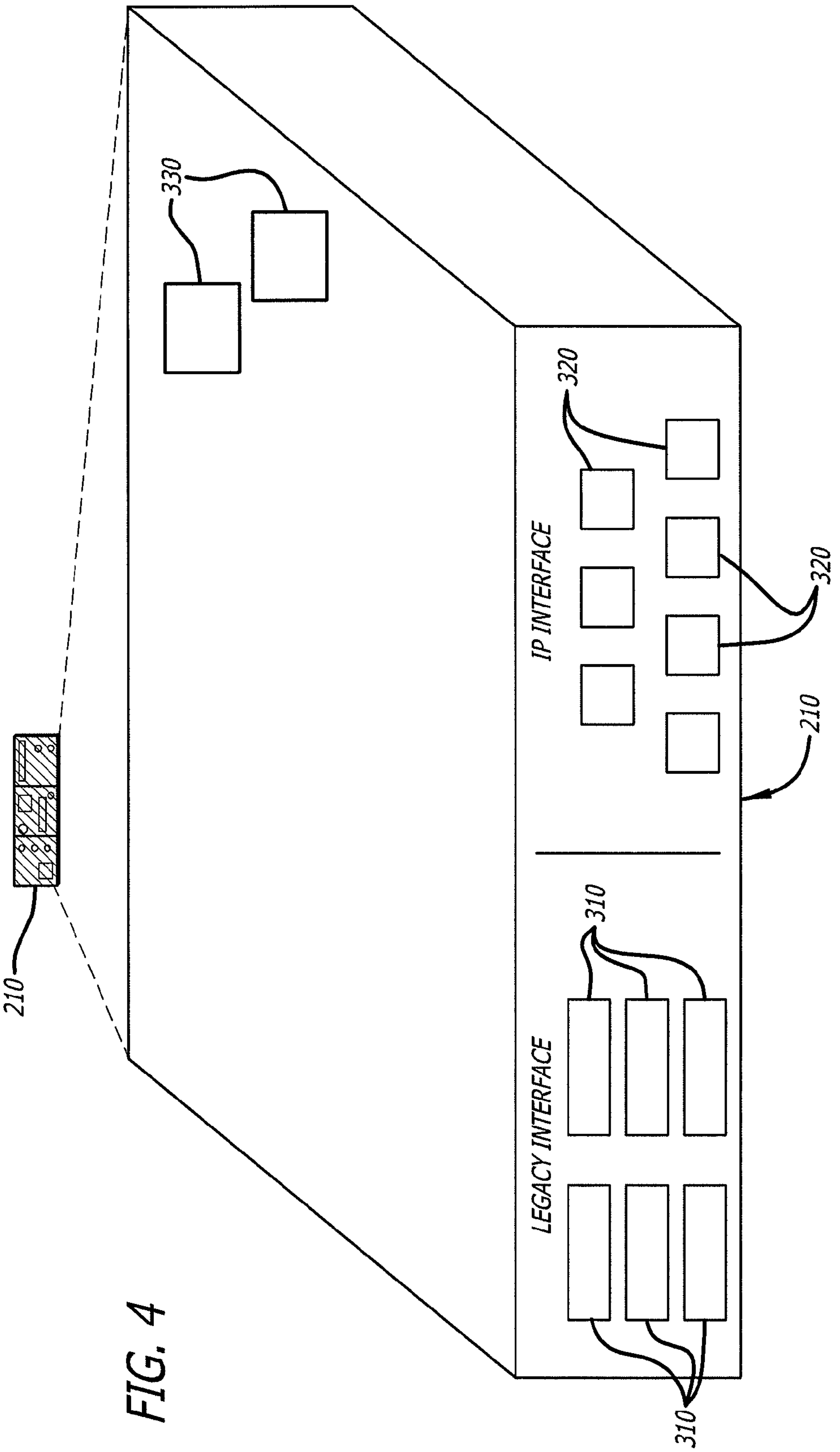
FIG. 4 illustrates connection interfaces of an advanced communication bridge of one embodiment.
Figure 5:
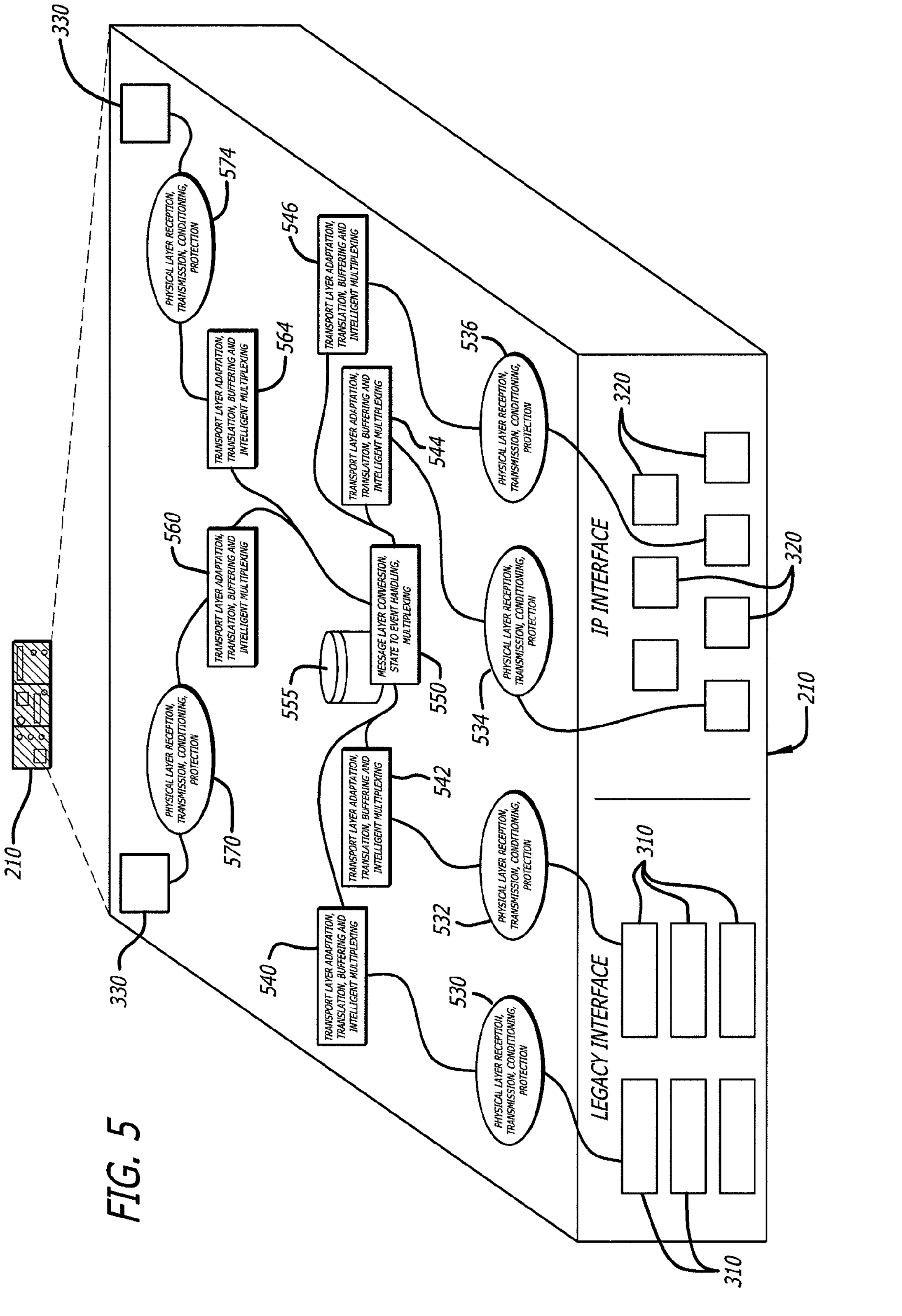
FIG. 5 is a diagram that illustrates data flow through functional units of an advanced communications bridge according to one embodiment.

A preferred embodiment of a representative hybrid network system 10 is shown in FIGS. 3-5. In this preferred embodiment, the legacy gaming devices 100, which use serialized protocol, are connected over a floor-side, serial, narrowband network 120. The hybrid network system 10 enables these legacy gaming devices 100 to co-exist with newer broadband gaming devices 200 that are connected over a floor-side, packet-based, broadband network 230. In this regard, the modern gaming devices 200 are broadband-capable in that the gaming devices 200 (or components inside them) accept and send higher speed, full-duplex, packetized messages. The legacy gaming devices 100 in this embodiment are limited to serial communications, and are therefore not capable of broadband communications. As described in further detail below, the advanced gaming networking bridges 210*a*, 210*b*, and 210*c* communicate with the gaming devices 100 and 200.

In one preferred embodiment, as shown in FIG. 3, the advanced gaming network bridge 210*a* interconnects the legacy gaming devices 100 via a floor-side, serial, narrowband network 120 to the backend, broadband network 130, and enables communication therewith. Continuing, in the preferred embodiment shown in FIG. 3, the advanced gaming network bridge 210*b* connects to legacy gaming devices 100 over a floor-side, serial, narrowband network 120 using a floor-side serial interface 310 (as shown in FIGS. 4 and 5), and connects to broadband gaming devices 200 over a floor-side, packet-based, broadband network 230 using a floor-side, IP (or other broadband) interface 320 (as shown in FIGS. 4 and 5). Additionally, the advanced gaming network bridge 210*b* also includes server-side, IP (or other broadband) interfaces 330 (as shown in FIGS. 4 and 5) for connecting to a server-side, broadband network 130 as well as backend servers 140, 180 and databases 160, 170. In this manner, the advanced gaming network bridge 210*b* enables both legacy gaming devices 100 and broadband gaming devices 200 to coexist on the hybrid network system 10 and communicate with backend servers 140, 180 and databases 160, 170 via the server-side, broadband network 130.

In another aspect of this one specific, non-limiting embodiment shown in FIG. 3, the advanced gaming network bridge 210*c* interconnects the broadband gaming devices 200 via a floor-side, packet-based, broadband network 230 to the backend, broadband network 130, and enables communication therewith. In a preferred embodiment, backend devices, such as slot data servers 140, 180 and databases 160, 170 do not require modification as a result of the incremental upgrading to broadband gaming devices 200 and a floor-side, packet-based, broadband network 230. Even fundamental broadband network 130 and 150 do not require modification due to the implementation of the hybrid network system 10. Further, software running in backend servers 140, the common database 160, and the property management servers 180, with their respective databases 170, remain consistent during the incremental upgrading from legacy gaming devices 100 and a floor-side, serial, narrowband network 120 to the new broadband gaming devices 200 and a floor-side, packet-based, broadband network 230. This saves effort and time by enabling backend devices 140, 160, 170, and 180 to continue to be utilized while accommodating new gaming devices 200 and networks 230 on the gaming floor and in the hybrid network system 10.

The legacy gaming devices 100 connected to bridge 210*b* are polled using a serial protocol, while the gaming devices 200 connected to the bridge 210*b*, and are polled, for example, using CSMA-CD Ethernet signaling. As shown in the embodiment of FIG. 3, the bridge 210*b* has two floor-side, interfaces (legacy interface 310 and IP interface 320 as shown in FIGS. 4 and 5), and a single server-side, interface. Accordingly, the bridge 210*b* converts messages received from the legacy gaming device 100 from a 7200 baud, RS422 protocol to another, non-polled, high-speed, broadband (packetized) communication protocol, such as Ethernet, TCP/IP and XML based GSA BOB. With respect to messages received from the new gaming devices 200, the conversion is only performed if necessary, as the new gaming devices 200 may already use the same protocol as the rest of the modernized server-side network. In this way, the legacy gaming devices 100 (and floor-side, serial, narrowband network 120) and the new gaming devices 200 (and floor-side, packet-based, broadband network 230) can exist within the hybrid network system 10 at the same time, such that the legacy gaming devices 100 can be either converted to the new protocol used by the gaming network or swapped out in favor of new gaming devices 200 over time.

It should be noted that bridge 210*a*, bridge 210*b*, and bridge 210*c* all have the same functionality, and the differences described above relate to the differing requests being made upon the bridges by the devices to which they are connected. Furthermore, since incrementally upgrading the gaming floor requires portions of the hybrid network system 10 to be changed from a floor-side, serial, narrowband network 120 to a floor-side, packet-based, broadband network 230, which requires the swapping out of physical wiring or cable, the capabilities of the advanced network bridge 210 enable such changes to the cabling in the network to be made over time as resources and availability allow. In this manner, just as the legacy gaming devices 100 and the new gaming devices 200 can coexist on the hybrid network system 10 and swapped out piece meal over time, the same incremental upgrading procedure can be utilized with respect to changing a floor-side, serial, narrowband network 120 to a floor-side, packet-based, broadband network 230. Throughout this procedure, continuity is maintained with communication messaging capabilities to and from the server-side network 130, as well as with the backend servers 140, 180 and databases 160, 170.

A preferred embodiment of a hybrid network system 10 is shown in FIG. 4. Specifically, FIG. 4 illustrates a preferred embodiment of a component of the hybrid network system 10, an advanced gaming device bridge 210. An advanced gaming device bridge 210 includes two distinct sets of input/output floor-side physical connectors: (1) floor-side, serial, physical connectors 310; and (2) IP-based, floor-side, physical connectors 320 (or other broadband, floor-side, connection points). Preferably, the physical connectors 320 are RJ45 connectors for 100Base T Ethernet connections. In an alternative preferred embodiment, the physical connectors 320 are fiber optic connections, token ring, ATM, or equivalent high-speed network communications interfaces. Additionally, the server-side, physical connectors 330 connect to the backend server 140 via a server-side, broadband network 130. In an alternative preferred embodiment, the server-side, physical connectors 330 accommodate multiple standards such as TCP/IP, Ethernet, USB, RS232, Fire wire, and other networking standards.

FIG. 5 illustrates a functional breakdown view of a preferred embodiment of the advanced gaming device bridge 210, and its component parts. The serial, floor-side, physical connectors 310 are connected to physical layer modules 530 and 532. There two physical layer modules 530 and 532 in order to accommodate different serial, floor-side, interfaces and thus different hardware physical connectors. Examples of different serial, floor-side, physical connectors include, by way of example only, and not by way of limitation, RS422, RS232, and RS485. These physical connectors are associated with protocols that are generally of a lower speed (e.g., below 100 Kbps nature).

Transport layer modules 540 and 542 accept physical layer reception from physical layer modules 530 and 532. Transport layer modules 540 and 542 handle transport layer issues such as polling, re-polling, CRC verification, and acknowledgements specific to the protocol being accepted. For example, one legacy protocol (e.g., transport layer module 540) may use RS422 and poll each device every 20 milliseconds, expecting to receive a message, check CRC, and provide an acknowledgement back to the gaming device.

In contrast, the protocol handled by transport layer module 542 may wait for an event at any gaming device with collision detection handled by hardware at physical layer module 532. Upon reception of a message, transport layer module 542 may be required to echo back to the device a request for additional information specific to the event received. Thus, a preferred embodiment of an advanced gaming device bridge 210 can accommodates a plurality of legacy slot floor hardware interfaces, which are typically referred to as the physical layer. Module 550 in conjunction with physical layer module 530 and in conjunction with transport layer module 540 also accommodate specifics of reception, response, and comprehension aspects of the legacy slot floor messages, which are typically referred to as the transport layer of the protocol.

Correspondingly, the IP-based, floor-side, physical connectors 522 are connected to physical layer modules 534 and 536. These physical layer modules 534 and 536 are generally higher data-rate interfaces, (e.g., 10 Mbps Ethernet in the form of 10Base T, USB, or high speed fiber optics). The physical layer modules 534 and 536 indicate adaptation to varying high speed network transport methods (e.g., Ethernet, token ring, ATM, and the like). Transport layer modules 544 and 546 adapt to the specifics of the protocol. For example, one protocol may employ TCP/IP and transport layer module 544 would then be responsible for IP address management, security and the like. Likewise, transport layer module 546 might handle MQ (message queuing) transport messaging and create and handle queues specific to message receipt and transmission.

In a preferred embodiment of an advanced gaming device bridge 210, the module 550 is responsible for: (1) accepting the messages incoming from the various sources; (2) normalizing the messages both temporally and logically; and (3) creating messages that are comprehendible to the system or device to which the converted messages were sent. Time-based (temporal) logic is implemented in this module 550 since some of the protocols being accepted are "polled at slow data rates" while others of the protocols being accepted are "event-based at fast data rates." In one embodiment, a data store 555 is accessed by module 550 in order to resolve the temporal messaging logic.

Continuing, transport layer modules 560 and 564 then convert the message information processed by module 550 into forms acceptable to various backend server systems 140. Physical layer modules 570 and 574 are hardware conversion modules to accommodate multiple forms of server-side, physical interfaces (e.g., Ethernet, ATM, wireless, and the like).

The embodiment of FIG. 5 is included inside a single physical housing. However, in other preferred embodiments, of the hybrid network interface 10 this particular configuration is not utilized. Any one or more of the modules or information paths can be contained in separate housings in any combination, or executed on separate processors or compute systems.

The following example illustrates a sample use according to one embodiment. Slot floors today typically use a relatively low-speed 7200 bps, RS422, polled protocol employing 80 to 180 byte hexadecimal HEX encoded binary messages. In one embodiment, the polled protocol is Communication Interface Unit (CIU) protocol Available from Bally Gaming, Inc. of Las Vegas, Nev. In CIU protocol, each component of the gaming device 100 to be polled is assigned an address. Messages are transmitted by the gaming device 100 through the floor-side, serial, narrowband network 120 to the bridge device 210 (FIG. 5) where the message enters the bridge 210 through the physical connectors 310 and is received by the hardware module 530. The bridge 210 accepts a 7200 bps or RS422 message, converting the message to binary signals and passing the message on to hardware module 530.

Preferably, the hardware module 530 polls for the data from one of the legacy gaming devices 100 and receives a message from a legacy gaming device 100, which in one embodiment, is a 7200 baud or RS422 message. The hardware module 530 verifies the integrity of the message and replies to gaming device 100 with an acknowledgement (ACK) message. Continuing, the data is passed to transport layer module 530 where the HEX coded data is broken into fixed packets and associated with its pre-defined meanings. This information is forwarded to the transport layer module 540 and data store 555 where the message meaning is normalized and analyzed both temporally and logically.

In this specific embodiment, the transport layer module 540 then processes decisions regarding the message meaning, which can include, for example, formulating a new message in a protocol preferred by the backend servers (e.g., Ethernet, transmission control protocol/internet protocol (TCP/IP), extensible markup language (XML), Gaming Standards Association (GSA) encoded BOB (Best of Breed) protocol, or the like). The message is then sent through transportation and physical layer modules 560 and 570 or 564 and 574 where the message is prepared and sent to a server (e.g. 140, 180) through physical ports 330 for action regarding the message.

In one embodiment, as part of the process of normalizing, transport layer module 540 converts serial streams into packetized data. For example, when polling of a legacy gaming device 100 indicates that the device 100 has to send a message to the network, a serial interface in the gaming device 100 repeatedly sends groups of bits over the floor-side, serial, narrowband network 120 to a floor-side, serial, physical connector 310 on the bridge 210. The bridge 20 receives each bit pattern sent through the floor-side, narrowband network 120, and standard acknowledgement signals are exchanged through the network 120, along with parity check conformations. This process is performed, according to industry standard serialized protocol, just a few bits at a time in order to form a data frame.

As part of the normalization process, as data frames are received, appropriate entries are made into a data packet prepared by module 540 for transmission into the backend (server-side) network 130. The opposite process is performed by module 540 when a packet is received from the backend (server-side) network 130 for a legacy gaming device 100. Further, this process is generally applied for conversion from synchronous polled binary serial transmission to asynchronous packetized transmission, wherein for example, the packets created by transport layer module 540 include XML packets.

In an alternate preferred embodiment, an older server computer may be connected to backend (server-side) network (in contrast to older gaming devices 100 of the gaming floor) that communicates with the bridge 210 using an older serialized polled protocol. This “legacy server” computer connects to one of the interfaces on the bridge 210 via a network (or other data line) in a similar fashion to the physical connections described above.

In another embodiment, the upgraded gaming floor protocol is BOB protocol, and along with serial protocol used by the legacy gaming devices 100, the bridge 210 converts all received messages to S2S protocol (as defined by the GSA). In another embodiment, the conversion performed by the bridge 210 is from an Acres protocol (a standard provided by Acres Gaming, Inc. of Las Vegas, Nev.) to BOB or SDT standard protocols (SDT is a standard messaging protocol available from Bally Gaming Systems, Inc., of Las Vegas, Nev.). In one aspect of this embodiment, conversion of messages from updated gaming devices 200 through ports 522 that are formatted in these more contemporary protocols occurs at the same time as conversion from serial protocols received from legacy gaming devices 100 through ports 310.

Figure 6:
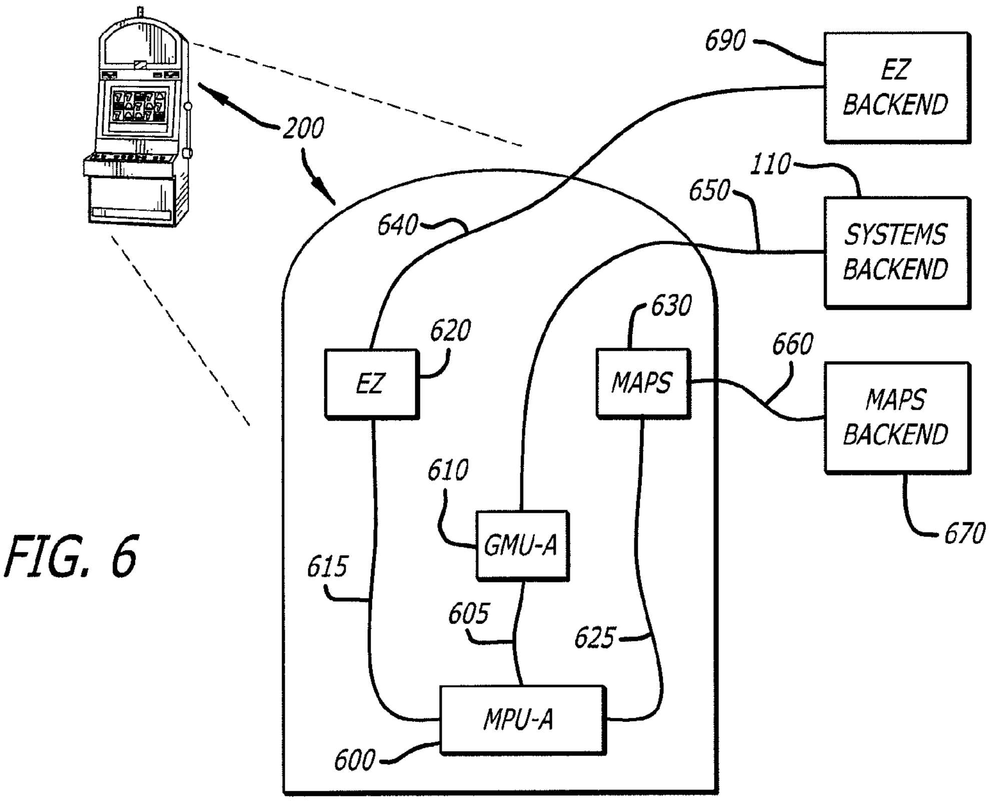
FIG. 6 is a diagram showing an implementation of a broadband network connection directly into the main processing unit of a gaming device.

In another embodiment, with reference to FIG. 6, an alternate or additional method of protocol manipulation and network adaptation is used. A legacy gaming device 100 has a main processing unit 600, controlling one or more games on the gaming device 100, along with all other devices and processes for the gaming device 100. A cable 625 connects a main processing unit 600 to a progressive game control communications device 630, and thereby a multi-area progressive system. In one embodiment, the cable 625 may use unique hardware and software protocols to transmit messages. The MAPS (multi area progressive system) system then connects over link 660 to a progressive gaming system backend 670. In one embodiment, a cable 660 uses any number of transport and messaging protocols for communication with the progressive gaming system.

A cable 605 connects the main processing unit 600 of the gaming device 100 to a game monitoring unit (GMU) 610, which monitors game play in the gaming system such that other processes are triggered if specified events occur, such as a door open or coin-in event. The GMU 610 further provides game and player tracking functions and connects over a cable 650 to a gaming systems backend 110. A cable 605 may use yet another physical, temporally distinct, and message-based protocol. In one embodiment, the protocol used by cable 605 is point-to-point and low speed, whereas the protocol used across the cable 650 is polled.

In one preferred embodiment, a cable 615 uses yet another protocol for sending ticket-related messages from the main processor unit 600 for ticket-based game play applications employing yet another physical interface medium. A ticketing system 620 processes messages for using tickets instead of cash during game play, and converts the messages received over the cable 615 to a format compatible with a cable 640. In one embodiment, for example, and not by limitation, the cable 640 is fiber optic based. The messages are transmitted to a ticketing backend server 690 over the cable 640.

Figure 7:
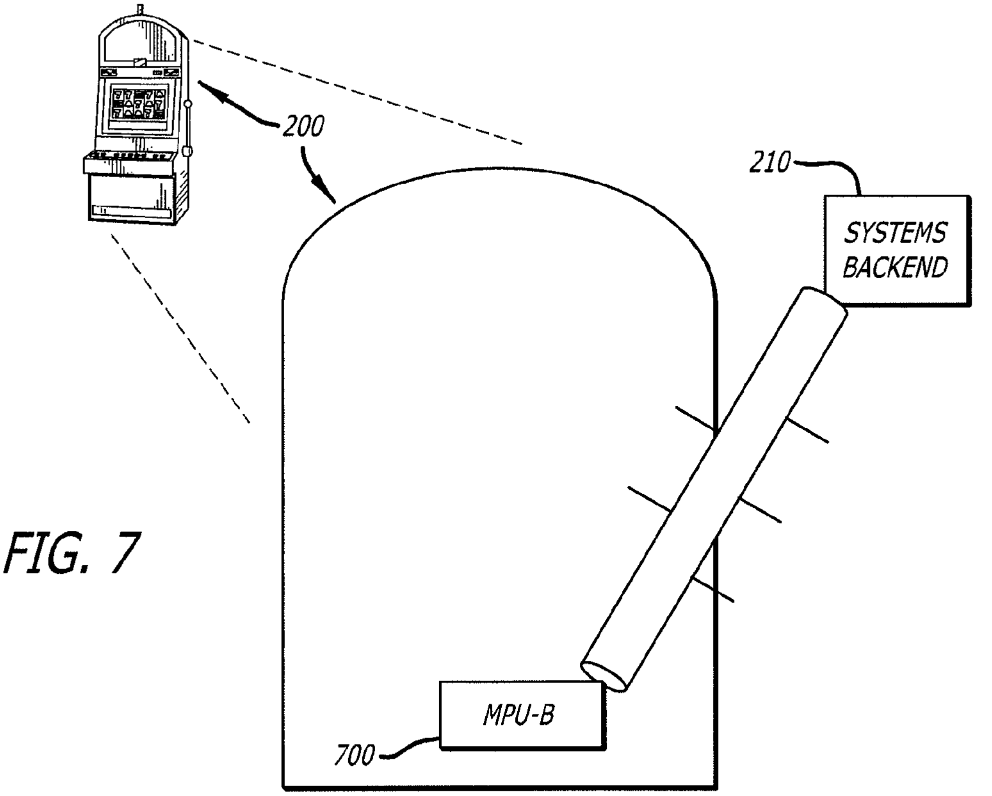
FIG. 7 is a diagram showing an implementation of a broadband network connection directly into the main processing unit of a gaming device.

With reference to FIG. 7, the trend of some updated gaming devices 200 provides for simplified broadband communication. All services from a broadband gaming device 200 are routed through a broadband communication pipe 230 (also shown in FIG. 3) to the bridge 210.

Figure 8:
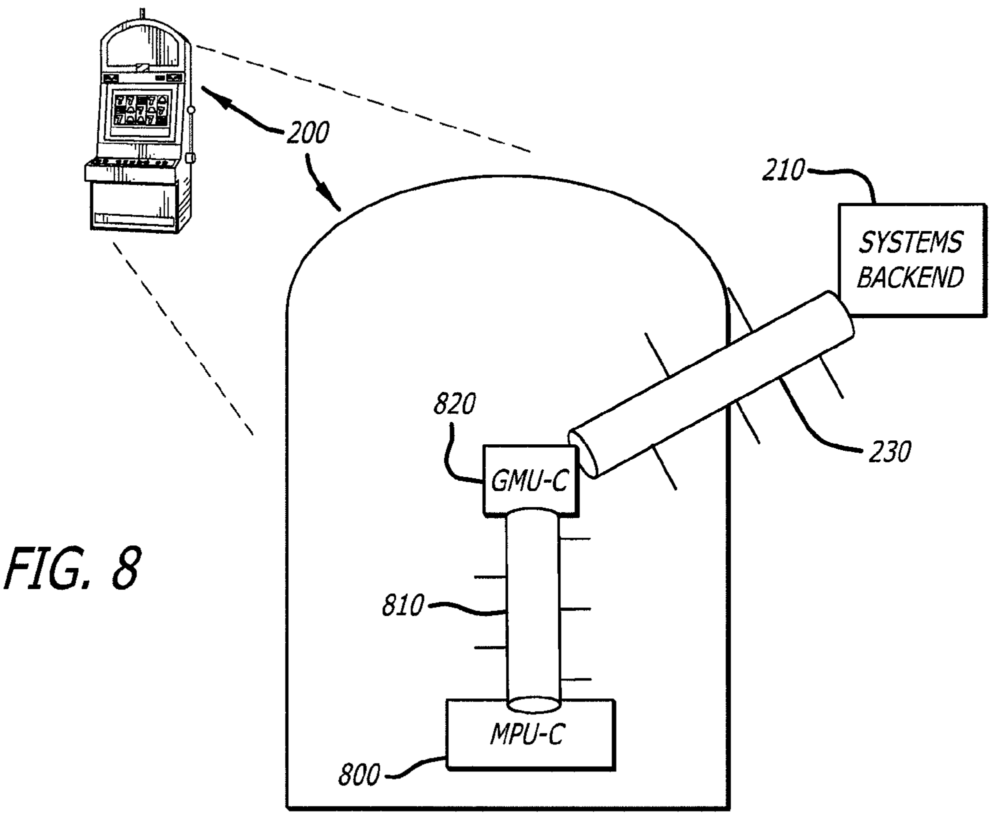
FIG. 8 is a diagram showing an implementation of a broadband network connection for a gaming device according to another embodiment.

According to yet another embodiment, with reference to FIG. 8, a method of protocol conversion provides for further simplification of broadband operation. In this embodiment, messages from all services from a relatively up-to-date broadband gaming device 200 are routed through a broadband communication pipe 230 to the systems backend bridge 210. The broadband gaming device 200 contains both a main processing unit (MPU) 600 for executing games, and a game monitoring unit (GMU) 610 for connection to advanced bridge 210. A broadband cable 230 connects the GMU 610 to the bridge 210. In one embodiment, the GMU 820 serves as a router and converter for the new, high-speed broadband connections. Some messages can be retained or filtered by the GMU 610, and some are passed to the MPU 600. In one preferred embodiment, the MPU 600 is a modern device capable of TCP/IP and Ethernet communications. In another embodiment, a legacy device 100 (FIG. 3) using a GMU 610 performs conversions from the high-speed, event-based protocol to the slow speed polled protocol expected by a legacy game (older game) executed on the legacy device, such as the bridge 210 described above. The MPU 600 communicates with the GMU 610 through the internal broadband network pipe 810.

While it is desirable for that the whole gaming floor is populated with such up-to-date broadband gaming devices 200 it is difficult to swap out older gaming machines 100 (FIG. 3) in one instance. Replacing all the gaming devices 100, the networks and necessary servers, all at once, when they are used in a 7-day, 24 hour, 365 day-a-year money making operation, is not practical if even feasible. The system provides for migration in an intelligent, business-like manner.

Figure 9:
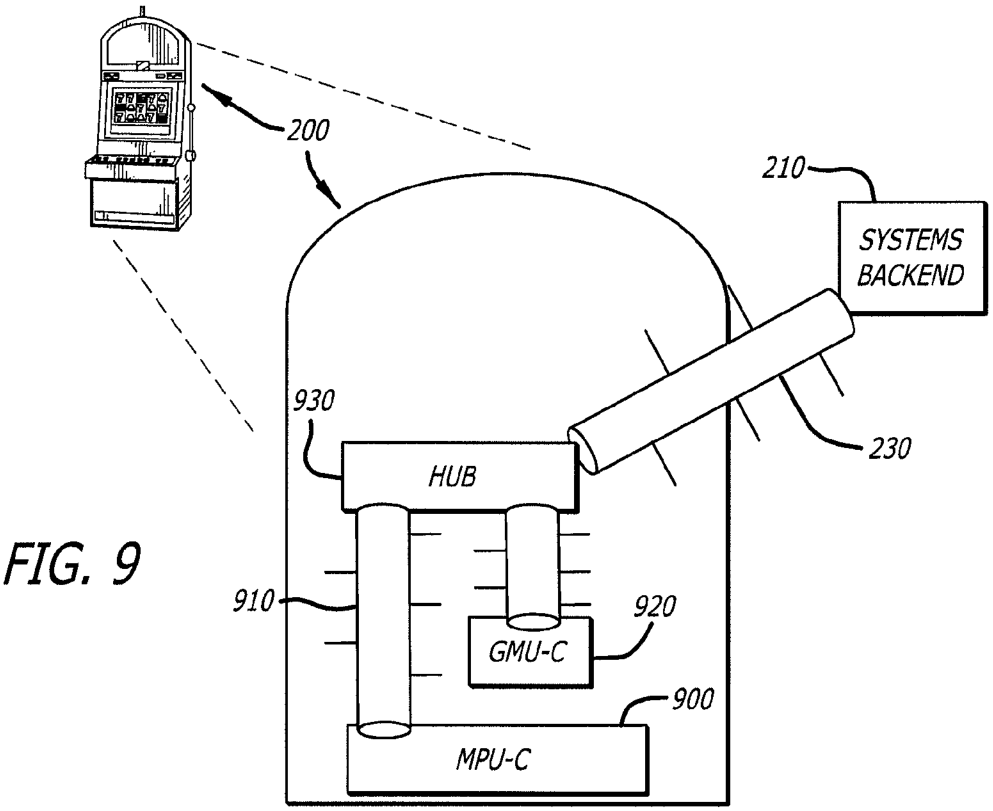
FIG. 9 is a diagram showing an implementation of another broadband network connection for a gaming device according to yet another embodiment.

FIG. 9 illustrates movement of data inside the gaming device according to another embodiment. A hub 930 performs as a termination point for broadband communications from the bridge 210 over the network 230. The hub then passes data to both the GMU 610 and the MPU 600. In this way, both the MPU 600 and the GMU 610 can be registered with the server 140 and individually addressed by the bridge 210.

In another embodiment, a two-wire exchange system is used through which to address each of the components of the gaming machine 200. For example, a two-wire exchange system is disclosed that enables a gaming machine having one communication port to function as a gaming machine having a plurality of communication ports. The two-wire exchange system allows a gaming machine having only a single communication port to connect to two or more system hosts simultaneously. The two wire exchange system uses an intelligent multiplexer that communicates with the bridge 210. In a preferred embodiment, the two-wire exchange system described in U.S. Pat. No. 6,863,611, issued Mar. 8, 2005 to Morrow et al., the entirety of which is herein incorporated by references, is incorporated into the gaming machine to provide individual component addressing and communication with the bridge.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A gaming network bridge that normalizes messages received in multiple protocols and over multiple network typologies for use in a hybrid network system, the gaming network bridge comprising:

a first floor-side port, wherein the first floor-side port enables interconnection with a first gaming machine that communicates with the bridge via a floor-side serial network using a first protocol, wherein the first protocol is a serial message protocol;

a second floor-side port, wherein the second floor-side port enables interconnection with a second gaming machine that communicates with the bridge via a floor-side packet-based network using a second protocol, wherein the second protocol is a packet-based message protocol; and a message converter, wherein the message converter is configured to convert the serial message protocol into a normalized packet-based message protocol for communicating with a backend, server-side network, and wherein the message converter is configured to convert the packet-based message protocol into the normalized packet-based message protocol for communicating with the backend, server-side network;

wherein the normalized packet-based protocol includes packets created by the message converter from serial frames received from the first port, and packets normalized by the message converter from packet-based messages received from the second port.

2. The gaming network bridge of claim 1, wherein the first protocol is a relatively low-speed serial polling protocol.

3. The gaming network bridge of claim 1, wherein the second protocol is a high-speed IP-based protocol.

4. The gaming network bridge of claim 1, wherein the first floor-side port is a relatively low-speed serial port.

5. The gaming network bridge of claim 1, wherein the second floor-side port is a broadband capable port.

6. The gaming network bridge of claim 1, wherein the second port is an Ethernet port.

7. A method for incrementally upgrading a hybrid network system, the system including a floor-side serial message network, a floor-side packet-based message network, a network bridge, and a server-side normalized message network, the method comprising:

connecting the floor-side serial message network to the network bridge, wherein the floor-side serial message network is in communication with one or more first gaming machines using a serial message protocol;

connecting the floor-side packet-based message network to the network bridge, wherein the floor-side packet-based message network is in communication with one or more second gaming machines using a packet-based message protocol;

connecting the server-side normalized message network to the network bridge, wherein the server-side normalized message network is in communication with one or more server-side devices using a normalized message protocol;

sending a serial message from a first gaming machine to a server-side device via the network bridge, converting the serial message sent from the first gaming machine in serial message protocol to a normalized message in normalized message protocol for receipt by the server-side device;

sending a packet-based message from a second gaming machine to a server-side device via the network bridge, and converting the packet-based message sent from the second gaming machine in packet-based message protocol to a normalized message in normalized message protocol for receipt by the server-side device.

8. The method of claim 7, wherein the first protocol is a relatively low-speed serial polling protocol.

9. The method of claim 7, wherein the second protocol is a high-speed IP-based protocol.

10. The method of claim 7, wherein the first floor-side port is a relatively low-speed serial port.

11. The method of claim 7, wherein the second floor-side port is a broadband capable port.

12. The method of claim 7, wherein the second port is an Ethernet port.

13. A hybrid network system for enabling incremental upgrading of gaming devices and a gaming network from a first protocol and first network typology to a second protocol and second network typology, the system comprising:

a floor-side serial message network, wherein the floor-side serial message network connects to one or more first gaming machines that communicate using a first protocol, wherein the first protocol is a serial message protocol;

a floor-side packet-based message network, wherein the floor-side packet-based message network connects to one or more second gaming machines that communicate using a second protocol, wherein the second protocol is a packet-based message protocol;

a server-side normalized message network, wherein the server-side normalized message network connects to one or more server-side devices that communicate using a normalized message protocol; and a network bridge, comprising:

a first floor-side interface for connecting to the one or more first gaming machines via the floor-side serial message network;

a second floor-side interface for connecting to the one or more second gaming machines via the floor-side packet-based message network;

a server-side interface for connecting to the one or more server-side devices via the server-side normalized message network; and a message converter, wherein the message converter is configured to convert the serial message protocol into the normalized message protocol for communicating with server-side devices over the server-side normalized message network, and wherein the message converter is configured to convert the packet-based message protocol into the normalized message protocol for communicating with the server-side devices over the server-side normalized message network.

14. The system of claim 13, wherein the packet-based message protocol is the same as a normalized message protocol used by the server-side devices, wherein it is not necessary to convert messages sent from the second gaming machines.

15. A method for incrementally upgrading a hybrid network system, the system including a floor-side narrowband message network, a floor-side broadband message network, a network bridge, and a server-side normalized message network, the method comprising:

connecting the floor-side narrowband message network to the network bridge, wherein the floor-side narrowband message network is in communication with one or more first gaming machines using a narrowband message protocol;

connecting the floor-side broadband message network to the network bridge, wherein the floor-side broadband message network is in communication with one or more second gaming machines using a broadband message protocol;

connecting the server-side normalized message network to the network bridge, wherein the server-side normalized message network is in communication with one or more server-side devices using a normalized message protocol;

sending a narrowband message from a first gaming machine to a server-side device via the network bridge, converting the narrowband message sent from the first gaming machine in narrowband message protocol to a normalized message in normalized message protocol for receipt by the server-side device;

sending a broadband message from a second gaming machine to a server-side device via the network bridge, and converting the broadband message sent from the second gaming machine in broadband message protocol to a normalized message in normalized message protocol for receipt by the server-side device.

16. A gaming network bridge that normalizes messages received in multiple protocols and over multiple network typologies for use in a hybrid network system, the gaming network bridge comprising:

a first floor-side interface, wherein the first floor-side interface enables interconnection with a first gaming machine that communicates with the bridge via a floor-side narrowband network using a first protocol, wherein the first protocol is a narrowband message protocol;

a second floor-side interface, wherein the second floor-side interface enables interconnection with a second gaming machine that communicates with the bridge via a floor-side broadband network using a second protocol, wherein the second protocol is a broadband message protocol;

a message converter, wherein the message converter is configured to convert the narrowband message protocol into a normalized broadband message protocol for communicating with a backend, server-side network, and wherein the message converter is configured to convert the broadband message protocol into the normalized broadband message protocol for communicating with the backend, server-side network; and a server-side interface, wherein the server-side interface enables interconnection with the message converter and the backend, server-side network.

17. A hybrid network system for enabling incremental upgrading of gaming devices and a gaming network from a first protocol and first network typology to a second protocol and second network typology, the system comprising:

a floor-side narrowband message network, wherein the floor-side narrowband message network connects to one or more first gaming machines that communicate using a first protocol, wherein the first protocol is a narrowband message protocol;

a floor-side broadband message network, wherein the floor-side broadband message network connects to one or more second gaming machines that communicate using a second protocol, wherein the second protocol is a broadband message protocol;

a server-side normalized message network, wherein the server-side normalized message network connects to one or more server-side devices that communicate using a normalized message protocol; and a network bridge, comprising:

a first floor-side interface for connecting to the one or more first gaming machines via the floor-side narrowband message network;

a second floor-side interface for connecting to the one or more second gaming machines via the floor-side broadband message network;

a server-side interface for connecting to the one or more server-side devices via the server-side normalized message network; and a message converter, wherein the message converter is configured to convert the narrowband message protocol into the normalized message protocol for communicating with server-side devices over the server-side normalized message network, and wherein the message converter is configured to convert the broadband message protocol into the normalized message protocol for communicating with the server-side devices over the server-side normalized message network.

18. A gaming network bridge that normalizes messages received in multiple protocols and over multiple network typologies for use in a hybrid network system, the gaming network bridge comprising:

a first floor-side port, wherein the first floor-side port enables interconnection with a first gaming machine that communicates with the bridge via a floor-side serial network using a first protocol, wherein the first protocol is a serial message protocol;

a second floor-side port, wherein the second floor-side port enables interconnection with a second gaming machine that communicates with the bridge, using a protocol that was not useable by the first gaming machine, via a floor-side packet-based network using a second protocol, wherein the second protocol is a packet-based message protocol; and a message converter, wherein the message converter is configured to convert the serial message protocol into a normalized packet-based message protocol for communicating with a backend, server-side network, and wherein the message converter is configured to convert the packet-based message protocol into the normalized packet-based message protocol for communicating with the backend, server-side network;

wherein the normalized packet-based protocol includes packets created by the message converter from serial frames received from the first port, and packets normalized by the message converter from packet-based messages received from the second port.

19. A method for incrementally upgrading a hybrid network system, the system including a floor-side serial message network, a floor-side packet-based message network, a network bridge, and a server-side normalized message network, the method comprising:

connecting the floor-side serial message network to the network bridge, wherein the floor-side serial message network is in communication with one or more first gaming machines using a serial message protocol;

connecting the floor-side packet-based message network to the network bridge, wherein the floor-side packet-based message network is in communication with one or more second gaming machines using a packet-based message protocol, the protocol not usable by the one or more of the first gaming machines;

connecting the server-side normalized message network to the network bridge, wherein the server-side normalized message network is in communication with one or more server-side devices using a normalized message protocol;

sending a serial message from a first gaming machine to a server-side device via the network bridge, converting the serial message sent from the first gaming machine in serial message protocol to a normalized message in normalized message protocol for receipt by the server-side device;

sending a packet-based message from a second gaming machine to a server-side device via the network bridge, and converting the packet-based message sent from the second gaming machine in packet-based message protocol to a normalized message in normalized message protocol for receipt by the server-side device.

* * * * *

UNITED STATES PATENT AND TRADEMARK OFFICE

CERTIFICATE OF CORRECTION

PATENT NO. : 8,064,478 B2
APPLICATION NO. : 11/225764
DATED : November 22, 2011
INVENTOR(S) : James W. Morrow et al.

It is certified that error appears in the above-identified patent and that said Letters Patent is hereby corrected as shown below:

Column 3
In line 26, insert --of-- after “capable”

Column 7
In line 61, replace “accommodates” with --accommodate--

Column 8
In line 41, replace “compute” with --computer--

Column 8
In line 48, replace “Available” with --available--

Column 10
In line 58, delete “for”

Column 16
In line 7, delete “the” after the word “by”

Signed and Sealed this
Thirty-first Day of January, 2012

David J. Kappos
*Director of the United States Patent and Trademark Office*